(12) United States Patent
Massel et al.

(10) Patent No.: US 11,390,549 B2
(45) Date of Patent: Jul. 19, 2022

(54) MANUAL FILTER PRESS WITH DISPLACEABLE FOLLOWER STOP

(71) Applicant: Evoqua Water Technologies LLC, Pittsburgh, PA (US)

(72) Inventors: Chad Massel, Caledonia, MI (US); Jason Letherby, Muskegon, MI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 273 days.

(21) Appl. No.: 16/491,820

(22) PCT Filed: Feb. 19, 2018

(86) PCT No.: PCT/US2018/018616
§ 371 (c)(1),
(2) Date: Sep. 6, 2019

(87) PCT Pub. No.: WO2018/164827
PCT Pub. Date: Sep. 13, 2018

(65) Prior Publication Data
US 2021/0129048 A1 May 6, 2021

Related U.S. Application Data

(60) Provisional application No. 62/468,986, filed on Mar. 9, 2017.

(51) Int. Cl.
*C02F 11/122* (2019.01)
*B01D 25/12* (2006.01)
(Continued)

(52) U.S. Cl.
CPC ............ *C02F 11/122* (2013.01); *B01D 25/12* (2013.01); *B01D 25/19* (2013.01); *B01D 25/21* (2013.01); *B01D 2201/202* (2013.01)

(58) Field of Classification Search
CPC ....... C02F 11/122; B01D 25/21; B01D 25/19; B01D 25/12; B01D 25/164; B01D 2201/202
See application file for complete search history.

(56) References Cited

U.S. PATENT DOCUMENTS 962,346 A 6/1910 Heller
1,793,080 A * 2/1931 Glover .................. B01D 29/01
210/236

(Continued)

FOREIGN PATENT DOCUMENTS

CN 104707390 A 6/2015

OTHER PUBLICATIONS

M.W. Watermark website https://www.mwwatermark.com/expand-my-filter-press/ and associated YouTube video https://youtu.be/V4Hz2sPFASQ (Year: 2013).*

*Primary Examiner* — Liam Royce

(57) ABSTRACT

A filter press includes a plurality of filter plates, a hydraulic cylinder, a follower plate through which the hydraulic cylinder is configured to apply pressure to the plurality of filter plates, and a spacer rod configured to transfer force from the hydraulic cylinder to the follower plate. The spacer rod is coupled to the follower plate by a moveable support that is displaceable between a home position in which the spacer rod is aligned with the hydraulic cylinder and a disengaged position in which the spacer rod is unaligned with the hydraulic cylinder.

9 Claims, 10 Drawing Sheets

(51) Int. Cl.
*B01D 25/19* (2006.01)
*B01D 25/21* (2006.01)

(56) References Cited

U.S. PATENT DOCUMENTS

| | | | | |
|---|---|---|---|---|
| 2,072,942 A | * | 3/1937 | Carver | B01D 25/287 |
| | | | | 100/113 |
| 5,194,148 A | | 3/1993 | Fresnius | |
| 2014/0299534 A1 | | 10/2014 | Neumann | |

* cited by examiner

MANUAL FILTER PRESS WITH DISPLACEABLE FOLLOWER STOP

CROSS REFERENCE TO RELATED APPLICATIONS

This application claims priority under 35 USC § 119(e) to U.S. provisional patent application Ser. No. 62/468,986, titled "LOW COST 630 MANUAL FILTER PRESS," filed Mar. 9, 2017, which is incorporated by reference herein in its entirety for all purposes.

BACKGROUND

Field of Invention

The present invention relates generally to filter presses and more specifically to manual filter presses and methods of operating same.

Discussion of Related Art

An industrial filter press is a tool used to separate solids and liquids. In use, slurry including a liquid and solids to be separated from the slurry are introduced into separating chambers defined between frames of the filter press. For each of the individual separating chambers, there is one hollow filter frame separated from two filter plates by filter media, for example, cloth, paper, or other water permeable material. Pressure is applied to the slurry within the filter press, for example, by a slurry pump. The pressure forces liquid in the slurry through the filter media disposed against surfaces of the frames and into liquid conduits within bodies of the hollow filter frames that drain the liquid out of the filter press. The retained solids (also referred to as filter cake) are removed from the filter press by separating the frames and removing the retained solids from surfaces of the filter media.

SUMMARY OF INVENTION

According to one aspect of the present invention there is provided a filter press. The filter press comprises a plurality of filter plates, a hydraulic cylinder; a follower plate through which the hydraulic cylinder is configured to apply pressure to the plurality of filter plates, and a spacer rod configured to transfer force from the hydraulic cylinder to the follower plate. The spacer rod is coupled to the follower plate by a moveable support that is displaceable between a home position in which the spacer rod is aligned with the hydraulic cylinder and a disengaged position in which the spacer rod is unaligned with the hydraulic cylinder.

In some embodiments, the moveable support comprises a swing arm coupled to the follower plate by a pivot. The swing arm may be configured to move the spacer rod through a plane defined by a face of the follower plate.

In some embodiments, the filter press further comprises an extension rod mounted in alignment with the hydraulic cylinder. The spacer rod may be aligned with the extension rod and disposed between the extension rod and the follower plate when the swing arm is disposed in the home position. The extension rod may be supported by one or more carrier plates. The spacer rod may be unaligned with the extension rod and disposed in a position above a one of the one or more carrier plates most proximate the follower plate when the swing arm is disposed in the disengaged position.

In some embodiments, the filter press further comprises a handle disposed on an opposite end of the swing arm from the spacer rod.

In some embodiments, the moveable support includes a retention element configured to hold the moveable support in at least one of the home position and the disengaged position.

In some embodiments, the moveable support comprises a slider plate configured to displace the spacer rod relative to the hydraulic cylinder.

In some embodiments, the moveable support comprises a hinge plate hingedly coupled to the follower plate.

In some embodiments, the filter press further comprises a manually operated hand pump configured to pressurize the hydraulic cylinder.

In accordance with another embodiment, there is provided a method of operating a filter press. The method comprises moving a plurality of filter plates of the filter press along rails of the filter press and into contact with one another and against a stationary head on one side of the plurality of filter plates, moving a follower plate into contact with an end filter plate on an opposite side of the plurality of filter plates from the stationary head, moving a spacer rod from a disengaged position in which the spacer rod is unaligned with a hydraulic piston of the filter press into a home position between the follower plate and the hydraulic piston, applying pressure to the follower plate by the hydraulic piston though the spacer rod, and introducing slurry to be filtered into filter chambers defined between adjacent filter plates.

In some embodiments, the method further comprises locking the moveable support into the home position prior to introducing the slurry into the filter chambers.

In some embodiments, the method further comprises depressurizing the hydraulic piston, moving the spacer rod into the disengaged position, and displacing the follower plate along the rails away from the end plate.

In some embodiments, moving the spacer rod comprises rotating a swing arm upon which the spacer rod is mounted about a pivot on the follower plate.

In some embodiments, the method further comprises locking the spacer rod in the disengaged position prior to displacing the follower plate along the rails away from the end plate.

In some embodiments, the method further comprises applying the pressure though an extension rod disposed between the hydraulic piston and the spacer rod.

In some embodiments, the method further comprises moving the spacer rod into the disengaged position and displacing the follower plate along the rails away from the end plate into a position in which the spacer rod is disposed above a carrier plate supporting the extension rod on the rails of the filter press.

In some embodiments, applying pressure to the follower plate by the hydraulic piston includes pressurizing the hydraulic piston with a hand pump until the hydraulic piston extends between about four inches from an unpressurized position.

In some embodiments, the method further comprises displacing the spacer rod into the disengaged position by displacing a slide plate coupled to the follower plate in one of a vertical and a horizontal direction along a surface of the follower plate.

In accordance with another aspect, there is provided a method of retrofitting a manual filter press. The method comprises mounting a spacer rod configured to transfer force from a hydraulic cylinder to a follower plate of the filter press on the follower plate.

In some embodiments, the method further comprises mounting the spacer rod on a moveable support that is displaceable between a home position in which the spacer rod is aligned with the hydraulic cylinder and a disengaged position in which the spacer rod is unaligned with the hydraulic cylinder.

BRIEF DESCRIPTION OF DRAWINGS

Various aspects of at least one embodiment are discussed below with reference to the accompanying drawings. In the drawings, which are not intended to be drawn to scale, each identical or nearly identical component that is illustrated in various drawings is represented by a like numeral. For purposes of clarity, not every component may be labeled in every drawing. The drawings are provided for the purposes of illustration and explanation, and are not intended as a definition of the limits of the invention. In the drawings.

DETAILED DESCRIPTION

Figure 1A:
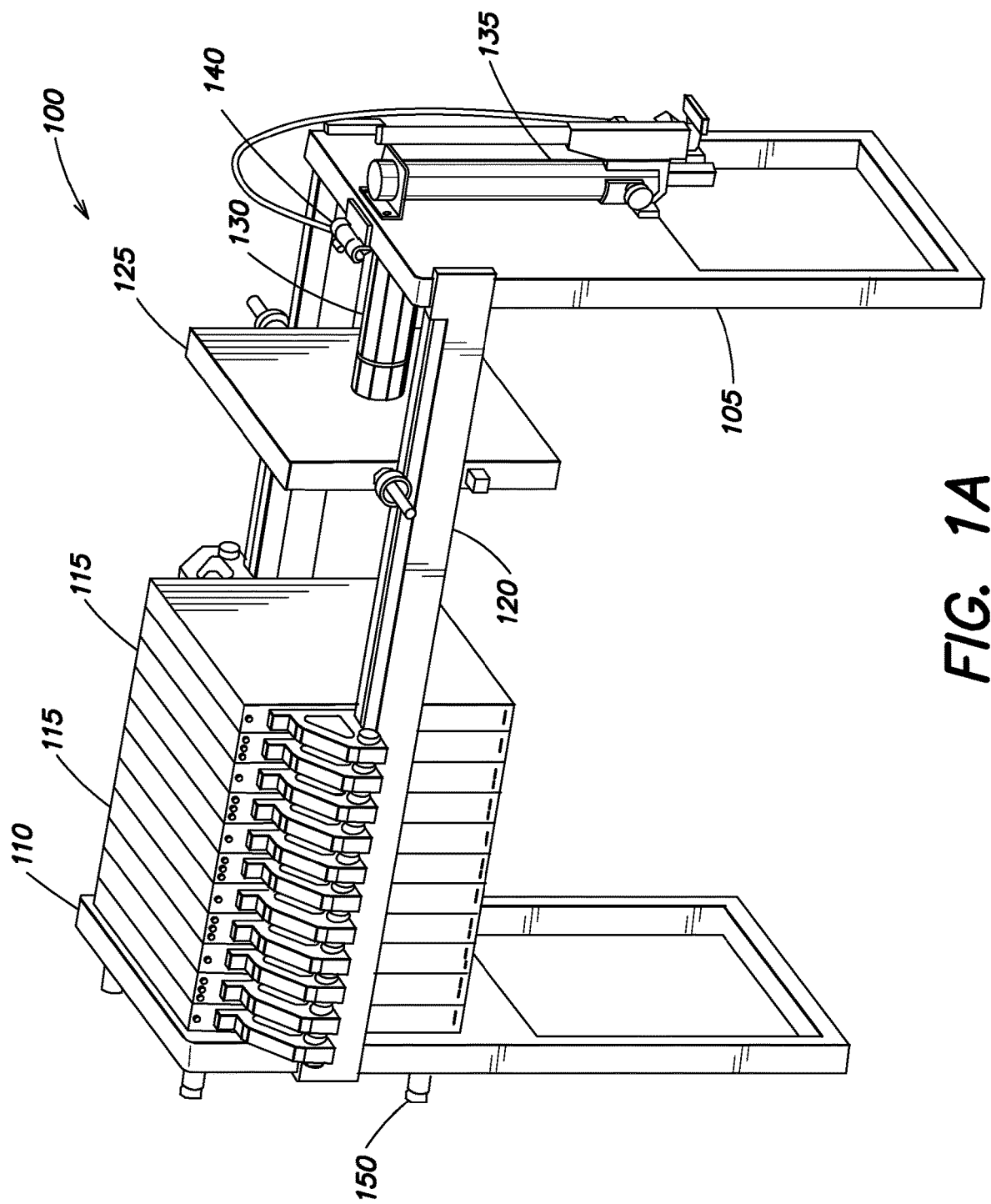
FIG. 1A is an isometric view of an embodiment of a manual filter press.

A filter press is typically operated as a fixed volume, batch pressure filter. As a fixed volume filter, it is built to hold a specific quantity of solids. The term "batch" refers to the fact a filtration cycle performed on using the filter press is stopped to discharge the collected "filter cake" prior to restarting a subsequent filtration cycle. "Pressure" is created by a feed pump pumping slurry including liquid and solids to be separated in the separation process.

A filter press may also be used as a "polishing" filter to remove minute quantities of solids from an influent stream. In these implementations the press is not sized for the quantity of solids holding capacity but for maximum filtration area and hydraulic throughput. When used as a polishing filter, generally a dry filter cake is not developed. Rather, when throughput flow rates drop to an unacceptable level, the cycle is ended.

A filter press may also be operated as a "variable volume" filter through the use of a filter plate known as a diaphragm or membrane plate. This type of plate has a flexible drain-field which when sealed around the edges forms an integral bladder or diaphragm that may be inflated to physically press additional liquid from the filter cake. This process can significantly reduce the typical elapsed time for a press cycle and produce a dryer cake product, or more uniform cake dryness from cycle to cycle.

Filter presses are sometimes called "Plate-and-Frame Filters." This refers to the style of filter element that was most prominent in the mid-1800s until the late 1960s. While this specialized style of the filter press is still manufactured today, the most common currently manufactured units are more accurately referred to as "Recessed Chamber Filter Presses" and/or "Diaphragm (Membrane) Filter Presses."

The pressure behind the slurry (typically about 100 psi, but up to 900 psi (7 to 60 bar)) is provided by a feed pump—sometimes a positive displacement or centrifugal pump. With a gravity drain on the filtrate side of the press, a pressure differential between the feed pressure and the gravity discharge is created across the media and the filter cake solids as they build in thickness.

It is the existence of this pressure differential, not just the feed pump pressure that causes the filtering action to occur. Solids within the slurry will flow to the area of cake development with the lowest pressure differential, resulting in a filter cake that builds uniformly over the drain-field on either side of the chamber walls.

This fill cycle continues until the filter cakes forming on the chamber walls bridge at the center, completely filling the press with solids. It is at this point that the filtration process is complete. Once this is achieved, the hydraulic closure of the press is retracted, the individual filter elements are separated and the filter cakes are discharged, usually by gravity, to an appropriate receptacle.

The major components of a filter press include a skeleton or frame, a stationary head, a follower head, hydraulics, and a slurry manifold.

The skeleton or frame holds the filter pack together against the pressures developed internally during the filtration process.

The stationary head is a fixed end plate that the plates comprising the filter pack are pressed against so that liquid tight seals may be developed between the filter plates to retain the slurry during filtering.

The follower head is a displaceable plate disposed on the opposite side of the filter pack from the stationary head. The follower plate moves toward the stationary head to press the filter plates together prior to introducing slurry into the filter press. After a filtering operation is complete, the follower plate retracts to provide space for the filter plates to be separated and for the filter cake produced during the filtration process to be removed.

Hydraulics are typically used to press the follower head against the filter pack. In some implementations, the hydraulics may apply a pressure of up to about 4000 psi (27.6 MPa) to the follower head to establish a proper liquid tight seal between the filter plates of the filter press.

A manifold receives slurry to be filtered and distributes the slurry to chambers defined between filter plates in the filter pack. In some embodiments, apertures are defined centrally in the filter plates to provide for slurry to be pumped into each of the chambers defined between the filter plates in a filter press.

In operation, slurry is pumped under pressure into the press chambers through the manifold at the stationary head of the filter press. As each chamber fills with slurry, the liquid passes through the filter media (for example, cloth), across the drain-field, through the drain ports and exits via gravity out of corner discharge eyes.

The filter media provides a porous support structure for the filter cake as it develops and builds. Initially, some solids may pass through the filter media causing a slight turbidity in the filtrate, but gradually the larger particles within the slurry begin to bridge the openings in the media, reducing the effective opening size. This allows smaller particles to bridge these reduced openings, initiating the cake filtration process. Once a layer of solid particles achieves one mm to two mm in thickness, this "precoat" layer serves to separate out finer and finer particles as the cake builds in thickness, yielding a filtrate that is very low in turbidity.

Once the differential pressure across the filter plates exceeds a certain value, the process is halted and the filtered material (filter cake) is removed from the filter press. To remove the filtered material, the filter press is opened and the filtered material or filter cake drops into a trough or hopper under the filter press. In some embodiments, the filter plates may be shaken or the filter media scraped to facilitate removal of the filter cake. Once most of the filtered material is removed, the filter plates are washed with a liquid and then put back into service. To wash the filter plates, a cloth washer may be employed. The cloth washer may sit on top of the filter press and travels back and forth directing a stream of liquid at the opened filter plates. If the filter plates need to be replaced, the cloth washer may be moved out of the way.

Many filter press apparatus are automated which adds complexity and cost to the system. Smaller filter press system can be manually operated. To make a filter press manual, however, may entail design changes that allow for an operator to move various components out of the way to load filter plates and to clean the filter cake from the filter plates.

Figure 1B:
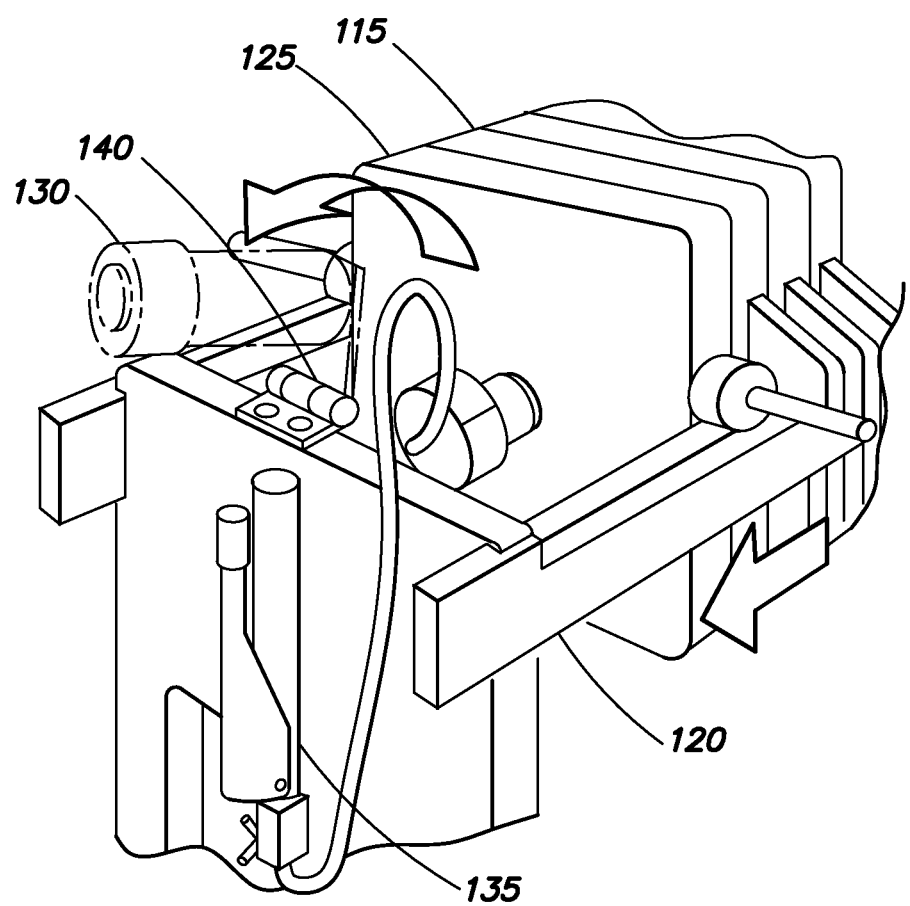
FIG. 1B illustrates a hydraulic cylinder that is hingedly coupled to a frame of a manual filter press.

One example of a manually operated filter press is illustrated generally at 100 in FIG. 1A. The filter press 100 includes a frame 105 that supports the various parts of the filter press. A stationary head 110 is defined on one end of the frame 105 against which the filter plates 115 are pressed during a filtration operation. The filter plates 115 may have dimensions of about 0.5 meters by about 0.5 meters, but aspects and embodiments disclosed herein are not limited to having filter plates of this size. The filter plates 115 are individually displaceable along rails 120 of the frame 105. A follower plate 125 is used to push the filter plates 115 together and against the stationary head 110. A hydraulic cylinder 130 is used to push the follower plate 125 against the filter plates. The hydraulic cylinder 130 is pressurized manually by use of a hydraulic hand pump 135. In some embodiments, it may require hundreds of strokes of the hand pump 135 to develop pressures sufficient to press the filter plates 115 together to a desired degree to prevent leakage of liquid or slurry from between the filter plates 115 during a filtration operation. The hydraulic cylinder 130 may be mounted to the frame 105 with a hinge 140 that allows the hydraulic cylinder 130 to be lifted out of the way (See FIG. 1B) after a filtration operation is completed to provide space for the follower plate 125 to be retracted away from the filter plates 115 and for the filter plates 115 to be separated by displacement along the rails 120 to remove the produced filter cake. One or more slurry inlets (not visible) and one or more liquid discharge ports 150 may be defined on the stationary head 110.

Problems with a conventional manually operated filter press as illustrated in FIG. 1A include that the follower plate 125 must press against the filter plates 115 during a filtration cycle and then travel sufficient distance to allow for the filter plates 115 to be separated by a sufficient degree to provide for the filter cake to be removed between subsequent filtration cycles. The hydraulic cylinder 130 must be pressurized such that the hydraulic cylinder 130 displaces the follower plate 125 across the entire length of travel of the follower plate 125. As noted above, this may require hundreds of pumps (sometimes between about 500 and about 600 pumps) of the hand pump 135. This pumping requires a great amount of time and physical effort by an operator. Further, lifting of the hydraulic cylinder 130, which may weigh, for example, about 22 pounds (10 kg), to provide space for the follower plate 125 to be displaced at the end of a filtration cycle so that the filter cake may be removed from the filter plates 115 is awkward and presents an ergonomic issue.

Aspects and embodiments disclosed herein may address one or more of the problems associated with traditional manually operated filter presses.

In one aspect, a spacer rod mounted on a swing arm is incorporated into a manual filter press. The spacer rod may be positioned in a home position aligned with and in series with the hydraulic cylinder to transfer force from the hydraulic cylinder to the follower plate during a filtration operation. After completion of the filtration operation the hydraulic cylinder may be depressurized and the swing arm may be utilized to move the spacer rod out of the way and out of alignment with the hydraulic cylinder. Moving the spacer rod out of alignment with the hydraulic cylinder allows the follower plate to be moved away from the filter plates to provide room for the filter plates to be separated from one another and emptied of filter cake. The swing arm may be disposed on the follower plate and may be held in place with a spring loaded pin while the follower plate is moved. Once the cleaning operation is complete and the filter plates and the follower plate are returned to position for performing another filtration operation and the swing arm is returned to the home position to provide for the hydraulic cylinder to apply pressure to the filter plates through the spacer rod to clamp the filter plates.

Figure 2:
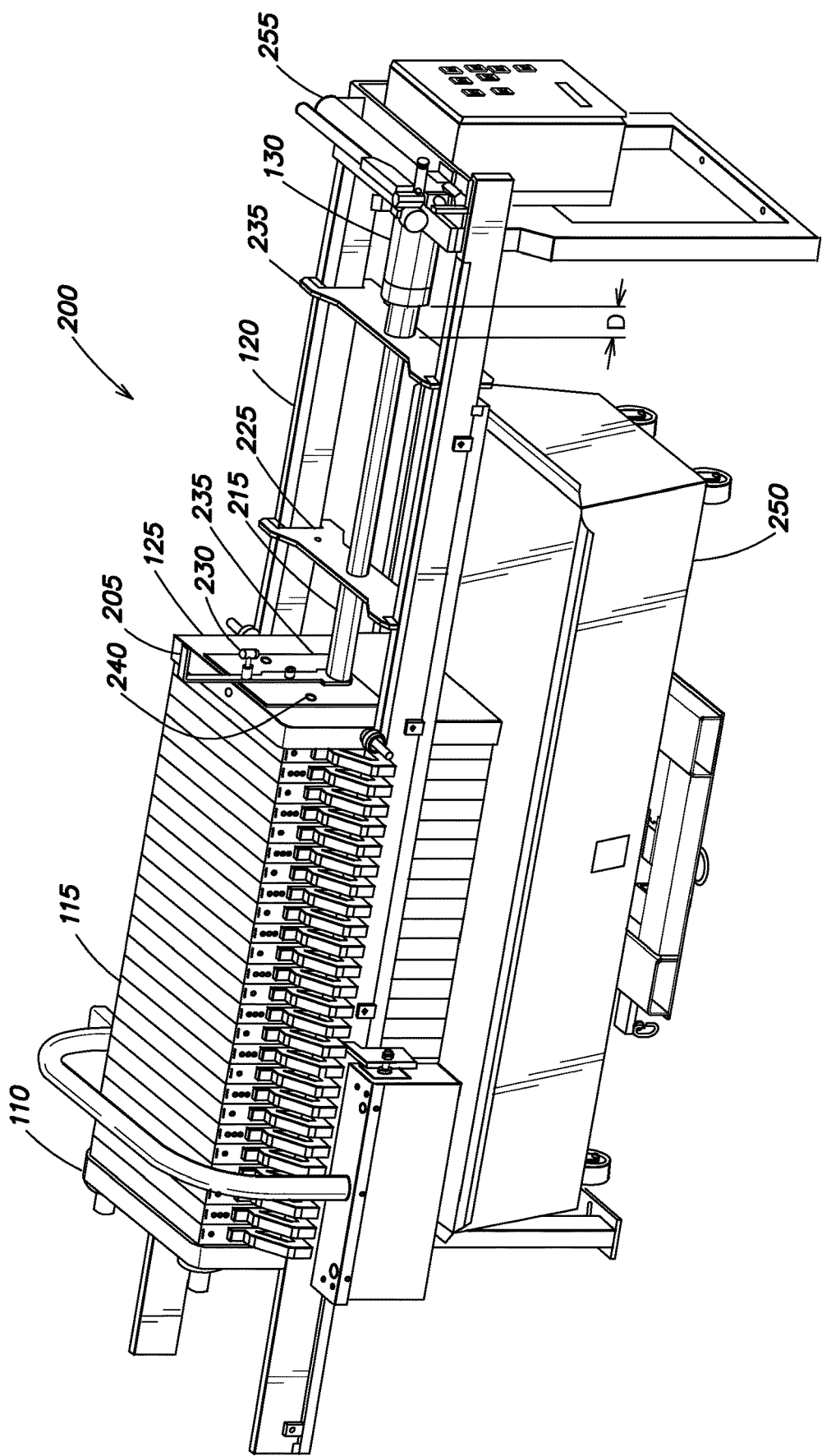
FIG. 2 is an isometric view of a manual filter press including a displaceable spacer rod mounted on a swing arm mounted to the face of the follower plate of the manual filter press.

One example of an improved manual filter press is illustrated generally at 200 in FIG. 2. The filter press 200 is illustrated with the filter plates 115 and follower plate 125 in a closed position in which filtration may be performed. The filter press 200 includes a swing arm 205 mounted on the follower plate 125. A pivot 210, for example, a cylinder passing through an aperture in the swing arm 205 and associated retainer, for example, a bolt or flange, provides for the swing arm 205 to rotate in a plane defined by the face of the follower plate 125. A spacer rod 215 is mounted to a lower portion of the swing arm 205. The spacer rod 215 is located at a center of the follower plate 125 when in the home position illustrated in FIG. 2 in which filtration may be performed using the filter press 200. The spacer rod 215 is in series with and collinear with an extension rod 220 and the hydraulic cylinder 130. In operation, the hydraulic cylinder 130 applies a force through the extension rod 220 and spacer rod 215 to the center of the follower plate 125 to clamp the filter plates 115 against one another. Carrier plates 225 support the extension rod 220 and may be displaced along the rails 120 as the hydraulic cylinder 130 moves the extension rod 220 back and forth. The extension rod 220 may terminate at faces of the carrier plates 225, or alternatively, may pass through apertures defined in the carrier plates 225. In some embodiments, the extension rod 220 is an optional feature and may be removed or replaced with a shorter extension rod 220 to allow space for additional filter plates 115 to be added to the filter press 200.

The swing arm 205 may include a retention element 230, for example, a spring loaded pin 230 that passes through the swing arm and into a home position aperture 245 (visible in FIG. 3) defined in the face of the follower plate 125 to hold the swing arm 205 and spacer rod 215 in the home position. Other retention mechanisms may include, for example, a locating pin permanently installed to the follower plate 125 that prevents the swing arm 205 from moving past a set point or holding bracket that swings down from the top of the follower plate 125 (like a chain link fence gate) and prevents side to side movement of the swing arm 205 and/or spacer rod 215. A wear resistant plate 235 may be mounted on the face of the follower plate 125 to prevent damage to the face of the follower plate 125 due to contact with the swing arm 205 as it is rotated. The wear resistant plate 235 may be composed of, for example, steel or another wear resistant material.

FIG. 2 also illustrates a bin 250 that may be used to capture filter cake removed from the filter press 200.

Figure 3:
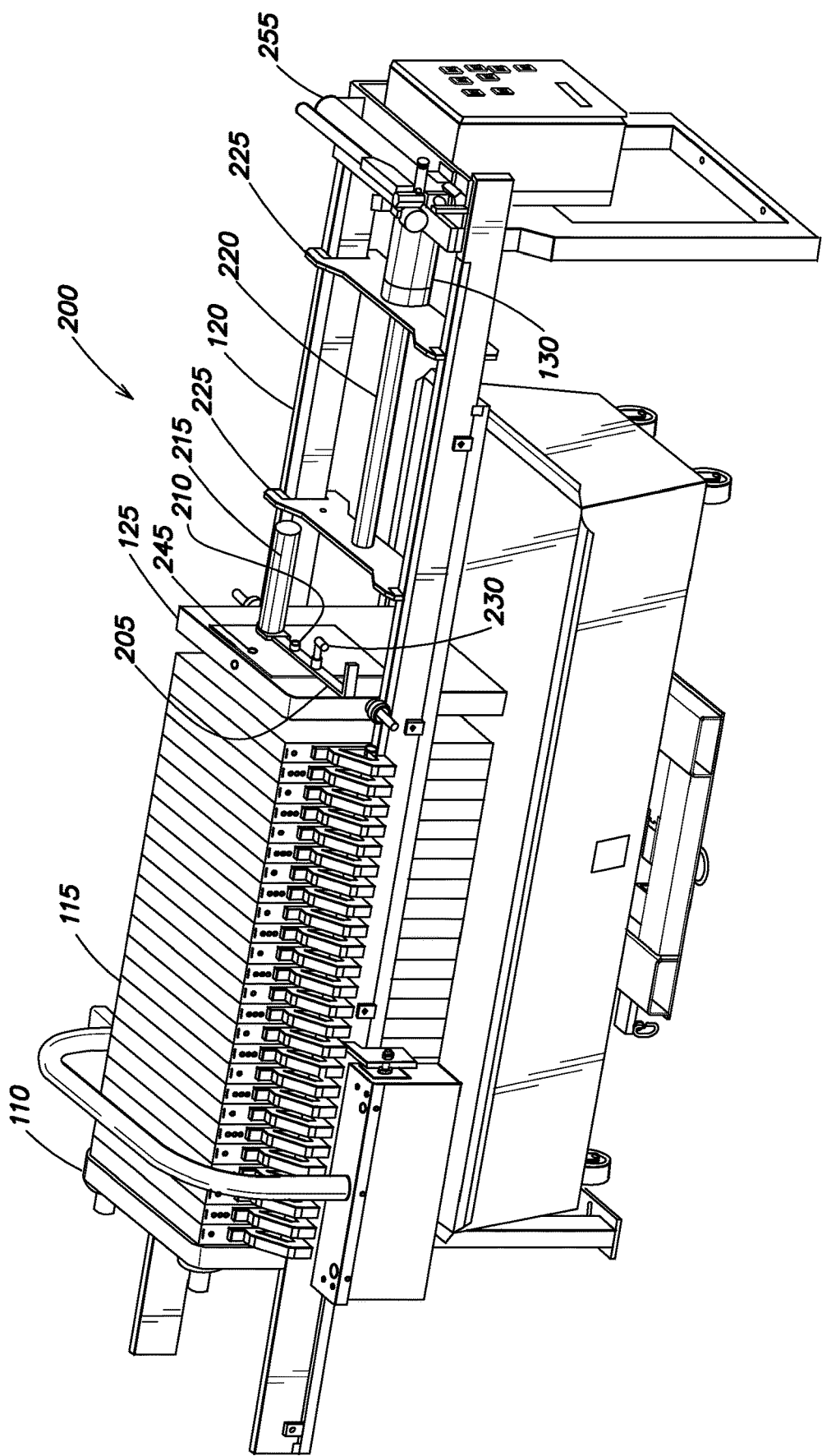
FIG. 3 illustrates the manual filter press of FIG. 2 with the spacer rod and swing arm in a disengaged position.

FIG. 3 illustrates the filter press 200 in a configuration in which the swing arm 205 has been rotated about the pivot 210 by about 90° into a disengaged position in which the spacer rod 215 has been moved out of alignment with the extension rod 220 and hydraulic cylinder 130. The swing arm 205 is held in the disengaged position by engagement of the retention pin 230 with a disengagement position aperture 240 (visible in FIG. 2) defined in the face of the follower plate 125. In the disengaged position illustrated in FIG. 3, the spacer rod 215 has been raised to a position above the upper edge of the carrier plate 225 proximate the follower plate 125. The follower plate 125 may thus be moved along rails 120 toward the hydraulic cylinder 130 and the spacer rod 215 will pass over the carrier plate 225 proximate the follower plate 125. The follower plate 125 may be moved along rails 120 toward the hydraulic cylinder 130 to provide ample space for the filter plates 115 to be separated and for filter cake to be removed from the filter plates. The hydraulic cylinder 130 illustrated in FIG. 3 has been retracted from the extended position illustrated in FIG. 2 and the extension rod 220 and carrier plates 225 have been drawn toward the end of the filter press 200 including the hydraulic cylinder 130 along the rails 120.

Figure 4:
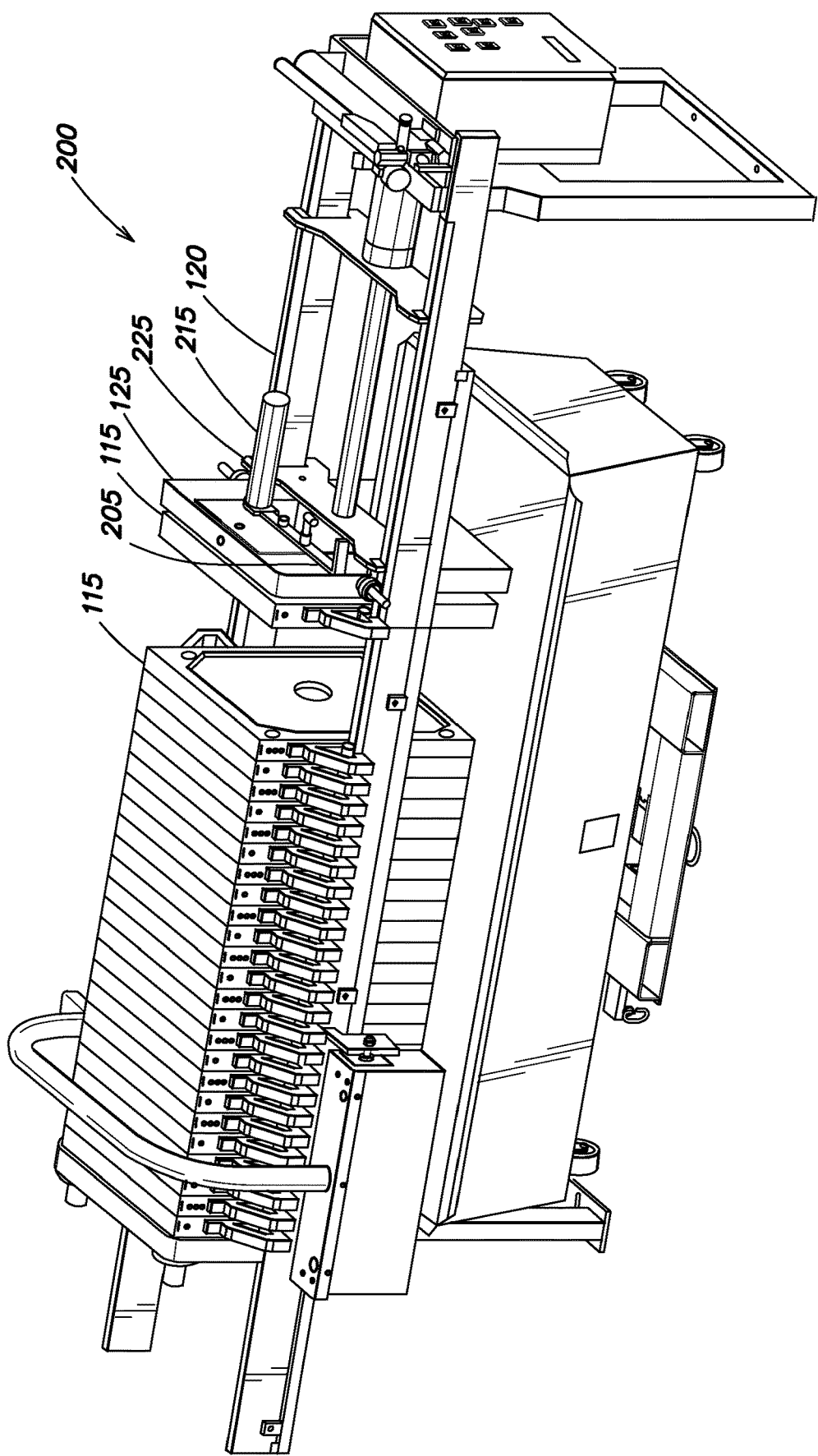
FIG. 4 illustrates the manual filter press of FIG. 2 with the spacer rod and swing arm in a disengaged position and the follower plate displaced from a position adjacent the filter plates of the manual filter press.
Figure 5:
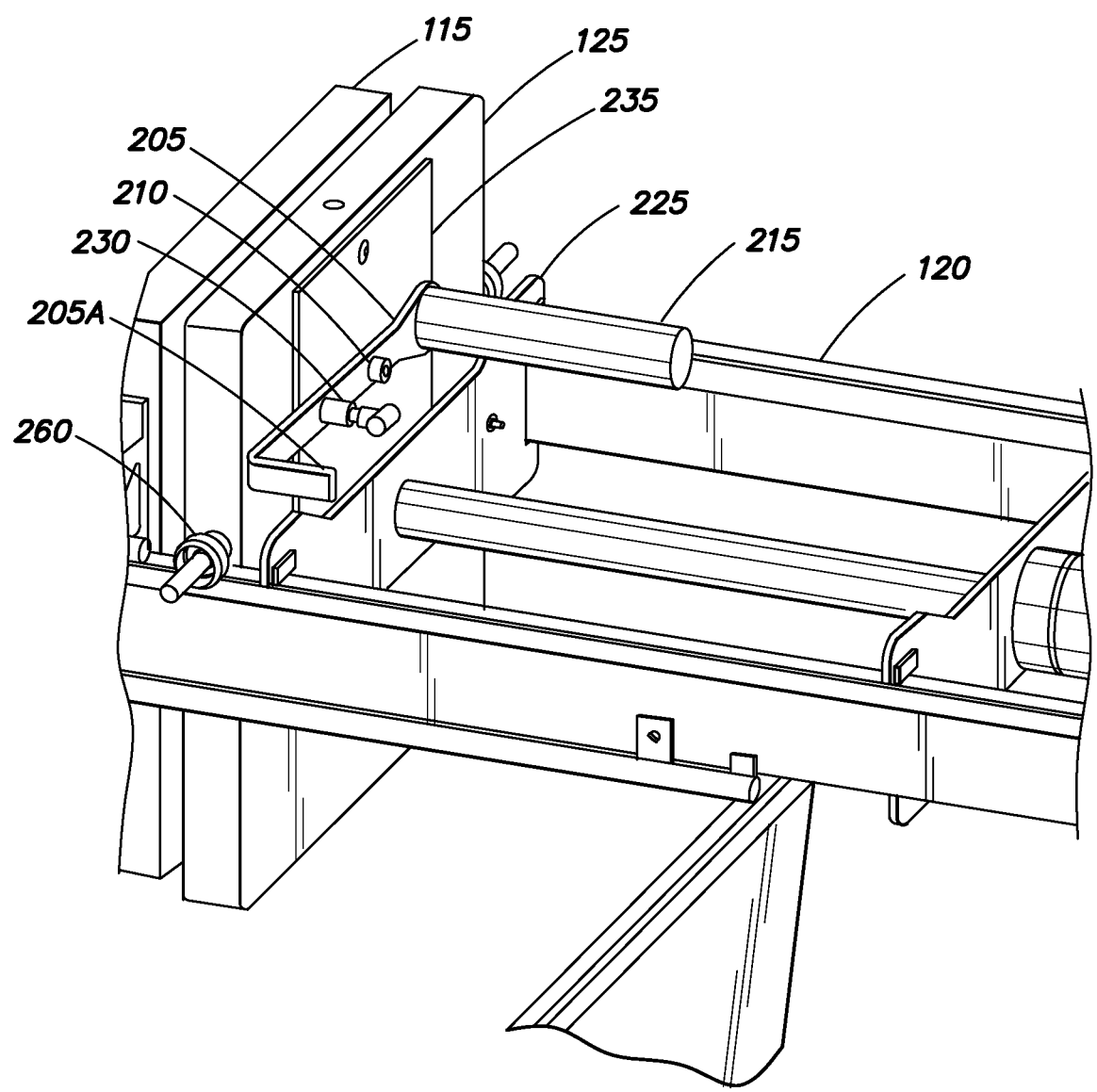
FIG. 5 is an enlarged view of the follower plate, spacer rod, and swing arm of the manual filter press of FIG. 2 with the spacer rod and swing arm in a disengaged position.

FIG. 4 illustrates a configuration in which the follower plate 125 has been displaced along rails 120 away from the filter plates 115 to allow space for the filter plates 115 to be separated and for accumulated filter cake to be removed from between the filter plates 115. In FIG. 4 the first pair of filter plates 115 closest to the follower plate 125 are illustrated as separated. FIG. 4 illustrates how the spacer rod 215 passes over the upper edge of the carrier plate 225 proximate the follower plate 125. FIG. 5 is an expanded view of the swing arm 205 in the pivoted disengaged position and the follower plate 125 displaced away from the filter plates 115 to a position proximate (or contacting) the carrier plate 225 proximate the follower plate 125. FIG. 5 also more clearly illustrates wheels 260 on the follower plate 125 upon which the follower plate 125 rolls across the rails 120 and a hand grip 205A disposed on the end of the swing arm 205 opposite the spacer rod 215.

Figure 6:
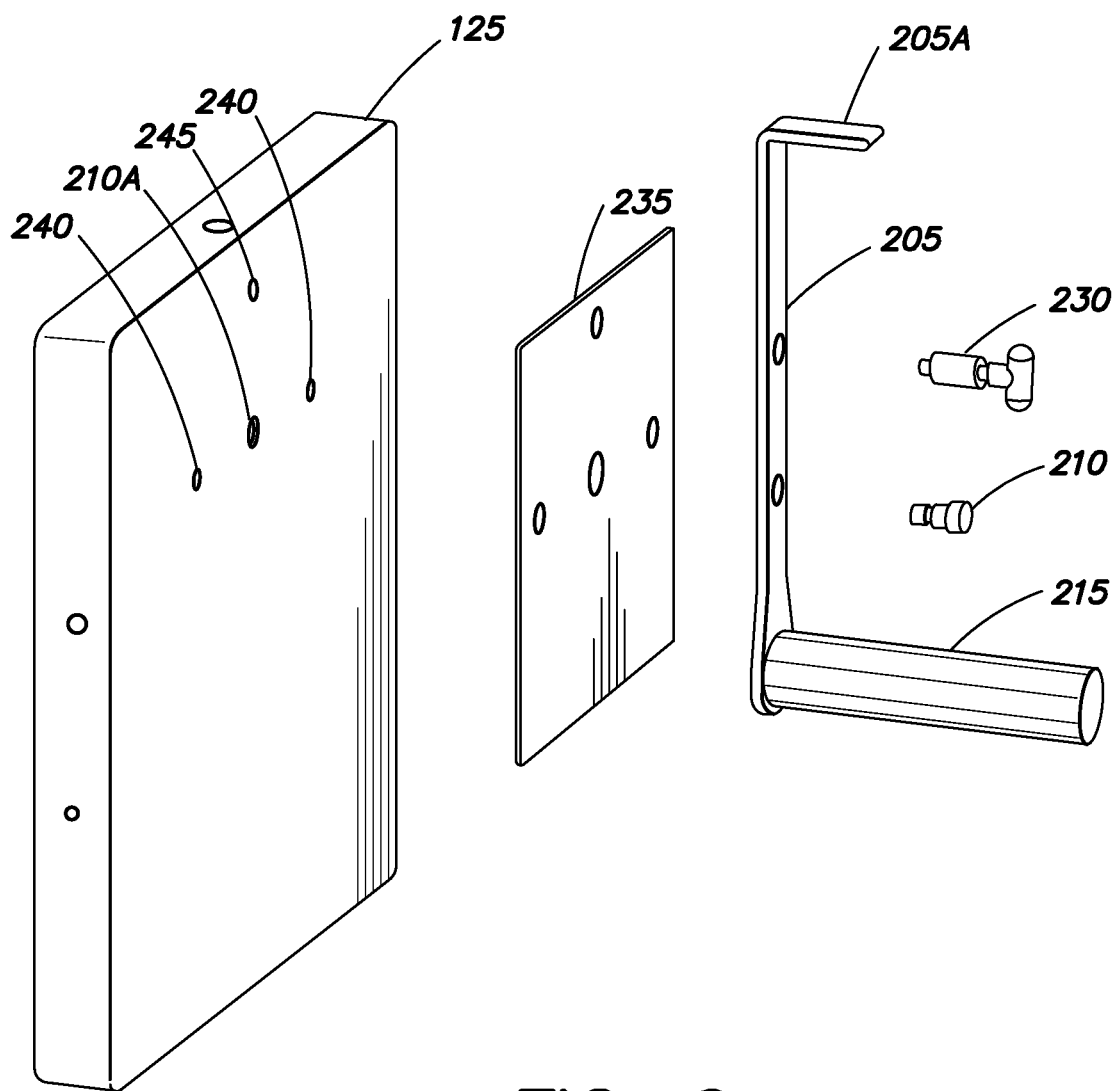
FIG. 6 is an exploded view of the follower plate, spacer rod, and swing arm of the manual filter press of FIG. 2.

FIG. 6 is an exploded view of the swing arm 205 and follower plate 125. Illustrated are apertures in the follower plate for receiving the pivot 210 (aperture 210A) and apertures for holding swing arm 205 in the home position with the spring loaded pin 230 (aperture 245) and apertures for holding the swing arm 205 in the disengaged position with the spring loaded pin 230 (apertures 240).

An advantage of aspects and embodiments of the disclosed filter press 200 is that the filter press 200 is more ergonomic and more easily operated than many prior art designs. Aspects and embodiments of the disclosed filter press 200 may operate with a lesser degree of extension and retraction of the hydraulic cylinder 130 than in some previous designs. In the disclosed filter press 200, the degree of extension of the hydraulic cylinder 130 that may be sufficient to properly clamp the filter plates 115 may be the distance D (about four inches (about 10.1 cm)) indicated in FIG. 2. In some previous designs the degree of extension of a hydraulic cylinder used to clamp the filter plates is approximately equal to the length of the spacer rod 215 (about 11.5 inches (29.2 cm)) in addition to the distance D. The filter plates 115 of the disclosed filter press 200 may be clamped by the hydraulic cylinder 130 using significantly less manual pumping than in some previous designs, for example, between about 30 and about 40 strokes of the hydraulic hand pump 255 as compared to between about 500 and about 600 strokes in some previous designs.

A further advantage of the disclosed filter press 200 as compared to some previous designs is that there is no need to lift the hydraulic cylinder 130 out of the way (FIG. 1B) to provide sufficient space to separate the filter plates 115 and remove accumulated filter cake. The hydraulic cylinder 130 may be mounted directly to the frame of the filter press 200. This provides additional ergonomic benefits and also provides for the use of a more robust and heavier hydraulic cylinder 130 if desired, for example, a hydraulic cylinder 300 weighing about 50 pounds (about 22.7 kg). The larger hydraulic cylinder 130 may achieve the higher pressures utilized to clamp larger plate sizes. Another advantage to having the hydraulic cylinder 130 mounted directly to the press frame is to keep the hydraulic cylinder 130 square to the follower and filter plates. The pivoting hydraulic cylinder 130 may not align squarely due to debris in the hinge or behind the plate on which it is mounted.

Figure 7:
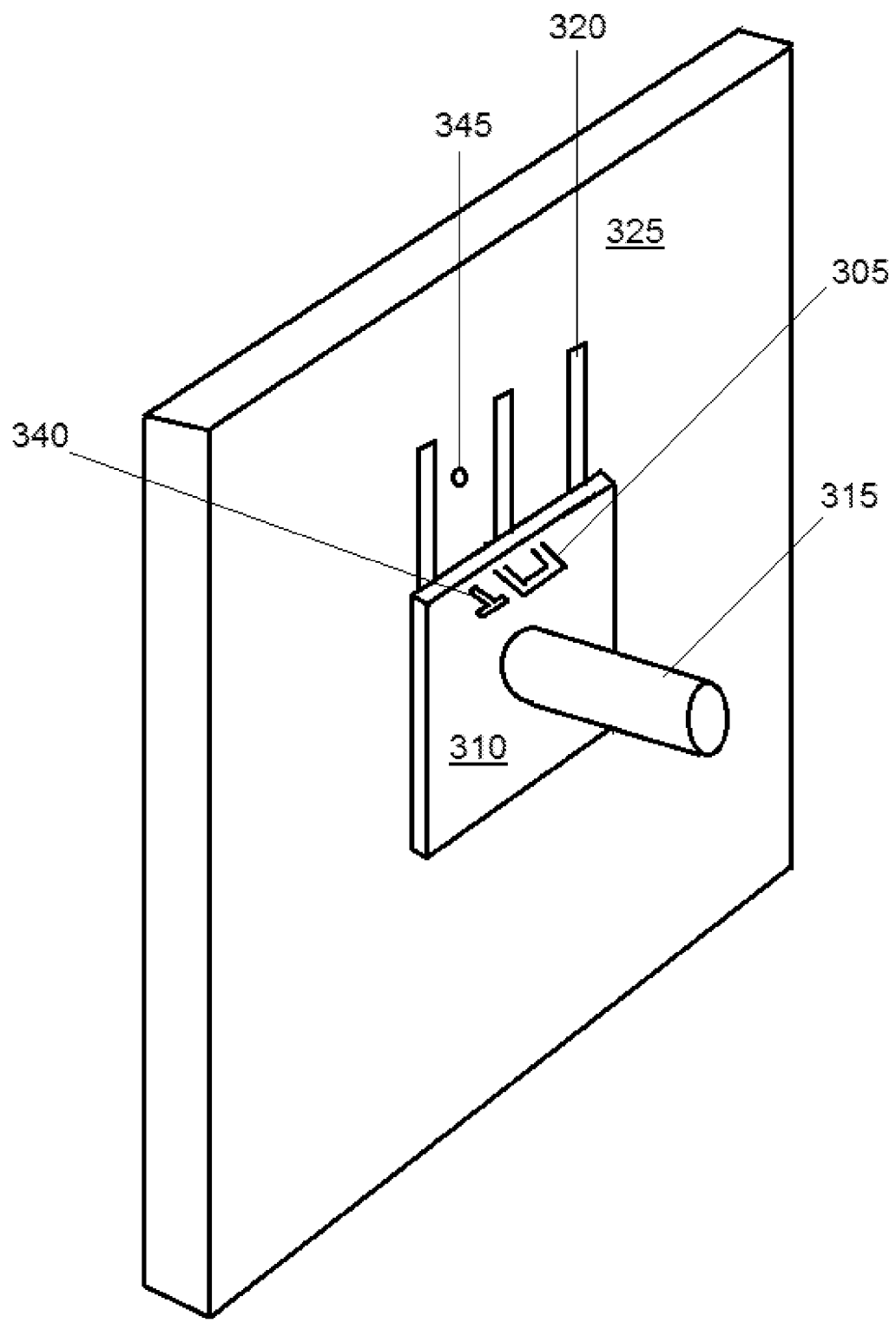
FIG. 7 illustrates a follower plate of a filter press with a spacer rod mounted on a vertically displaceable slider plate.

Aspects and embodiments disclosed herein are not limited to utilizing a swing arm 205 to move a spacer rod 215 into and out of alignment with a hydraulic cylinder 130 and/or extension rod 220 to provide for clamping and separation of the filter plates 115. In some alternate embodiments, the spacer rod 215 may be displaceable in a vertical direction with respect to the hydraulic cylinder 130 and/or extension rod 220. In an example illustrated in FIG. 7, a spacer rod 315 is mounted on a slider plate 310 that is coupled to a follower plate 325 (other portion of the filter press are omitted from FIG. 7 for clarity). The slider plate 310 may move through one or more slots or channels 320 defined in the follower plate 325 to move the spacer rod 315 into or out of alignment with a corresponding hydraulic cylinder 130 and/or extension rod 220, for example, a hydraulic cylinder 130 and/or extension rod 220 as illustrated in FIG. 2. A handle 305 may be disposed on the slider plate 310 for a user to use to push or pull the slider plate 310 into a desired position. One or more quick release fasteners, for example, spring loaded T-pins 340 may engage apertures 345 defined in the face of the follower plate 325 to hold the slider plate 310 and spacer rod 315 in a home position aligned with the corresponding hydraulic cylinder 130 and/or extension rod 220 or in a disengaged position unaligned with the corresponding hydraulic cylinder 130 and/or extension rod 220.

Figure 8:
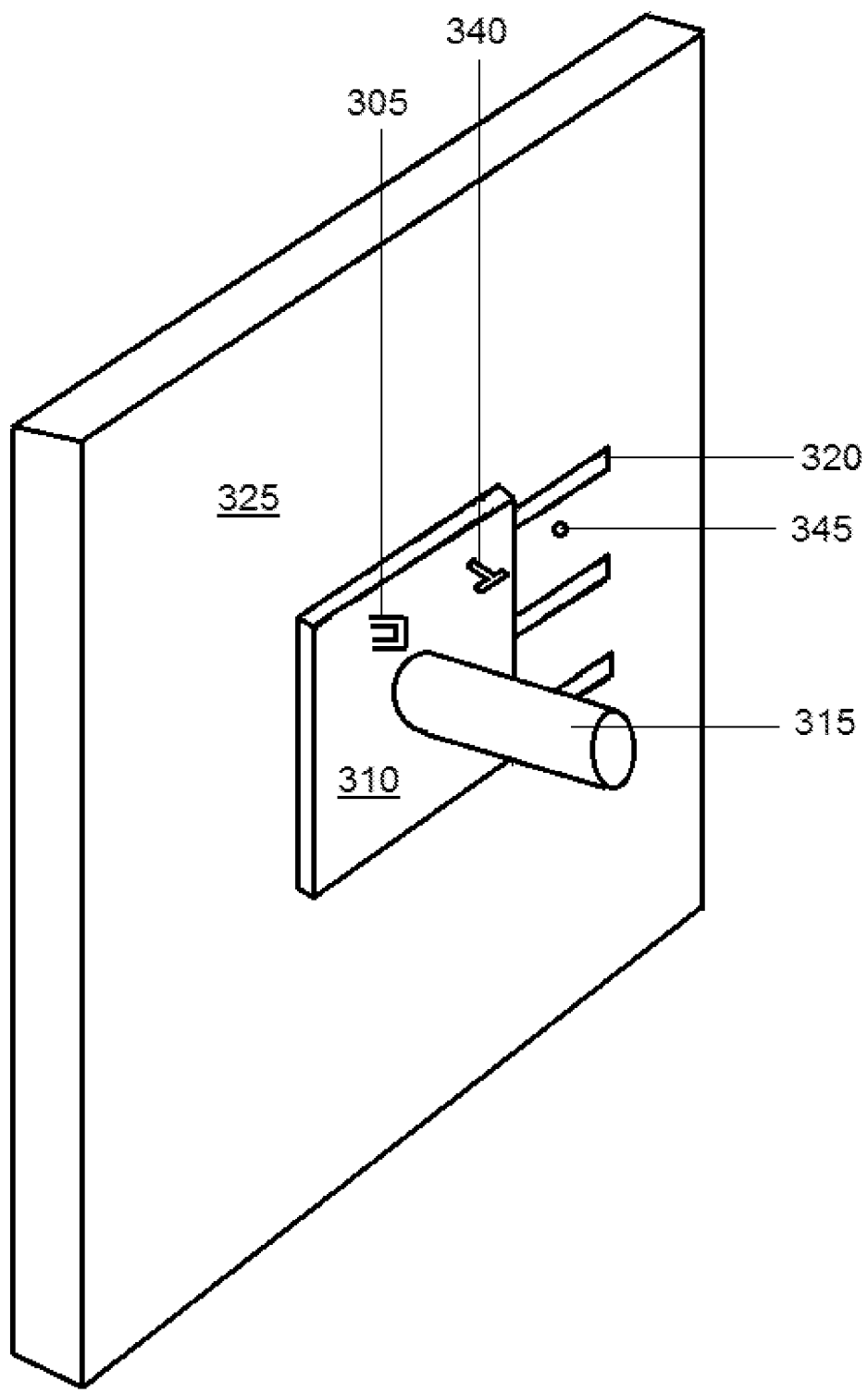
FIG. 8 illustrates a follower plate of a filter press with a spacer rod mounted on a horizontally displaceable slider plate.

In another embodiment, illustrated in FIG. 8, the slider plate 310 may be used to slide the spacer rod horizontally into or out of alignment with the corresponding hydraulic cylinder 130 and/or extension rod 220. In FIG. 8 like indicator numbers refer to like features illustrated in FIG. 7.

Figure 9:
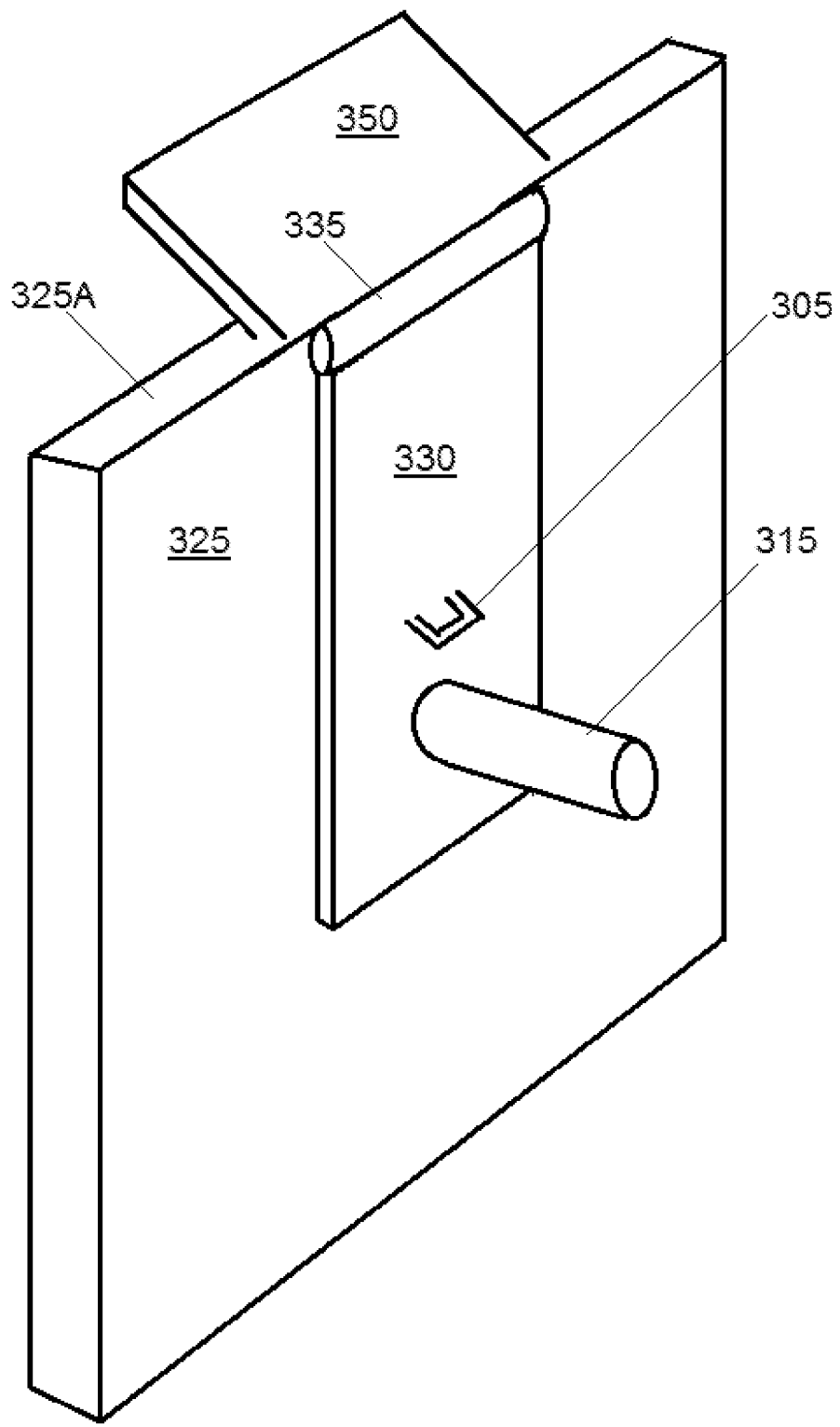
FIG. 9 illustrates a follower plate of a filter press with a spacer rod mounted on a hinge plate coupled to the follower plate by a hinge.

In a further embodiment, illustrated in FIG. 9, the spacer rod 315 may be coupled to a hinge plate 330 that is connected to the follower plate 325 by a hinge 335 that may be disposed, for example, on the face of the follower plate 325, for example, an upper edge of the face of the follower plate. A support plate 350 may extend from an upper edge 325A of the follower plate 325 and may be used to support the hinge plate 330 and spacer rod 315 when the hinge plate 330 is rotated upward to move the spacer rod 315 out of alignment with the hydraulic cylinder 300 and/or extension rod 220. The hinge may alternatively be disposed on a side of the follower plate 325 or the bottom of the follower plate 325. The hinge plate 330 may provide for an operator to swing the spacer rod 315 on the hinge plate 330 to the up (or down or to the side) and out of alignment with a corresponding hydraulic cylinder 130 and/or extension rod 220 when desired to make room for the follower plate 325 to be displaced from the filter plates 115 and for the filter plates 115 to be separated to remove accumulated filter cake.

In accordance with further aspects and embodiments, an existing filter press may be modified or retrofitted to include any of the embodiments of spacer rod and associated mounting mechanisms described above. For example, a filter press 100 such as illustrated in FIG. 1A may be modified by mounting a swing arm 205 including a spacer rod 215 as illustrated in the embodiment of FIG. 2 on the follower plate 125. Mounting the swing arm 205 on the follower plate 125 of the existing filter press 100 may include drilling a hole for a pivot 210 and optionally holes or other receiving features for one or more retention elements 230. The pivot 210 may be mounted on the follower plate 125 and the swing arm 205 may be mounted on the pivot 210. A wear plate 235 may optionally be mounted on the follower plate beneath the swing arm 205. The swing arm 205 may be rotated to place the spacer rod 215 in the center of the follower plate 125 and aligned with the hydraulic cylinder 130 prior to performing a filtration operation in the filter press 100. During the filtration operation the hydraulic cylinder 130 applies pressure to the follower plate 125 and filter plates 115 through the spacer rod 215 (and any extension rod 220 if present). After the filtration operation, pressure may be released from the hydraulic cylinder 130, the spacer rod 215 may be moved out of alignment with the hydraulic cylinder 130 using the swing arm 205, and the filter plates 115 may be separated to remove accumulated filter cake.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while acts of the disclosed processes are presented in a given order, alternative embodiments may perform routines having acts performed in a different order, and some processes or acts may be deleted, moved, added, subdivided, combined, and/or modified. Each of these processes or acts may be implemented in a variety of different ways. Also, while processes or acts are at times shown as being performed in series, these processes or acts may instead be performed in parallel, or may be performed at different times.

The teachings of the invention provided herein can be applied to other systems, not necessarily the system described above. The elements and acts of the various embodiments described above can be combined to provide further embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment of this invention, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A filter press comprising:
a plurality of filter plates;
a hydraulic cylinder;
a follower plate through which the hydraulic cylinder is configured to apply pressure to the plurality of filter plates; and
a spacer rod configured to transfer force from the hydraulic cylinder to the follower plate, the spacer rod being coupled to the follower plate by a moveable support including a swing arm coupled to a face of the follower plate by a pivot, the swing arm configured to rotate about the pivot in a plane defined by the face of the follower plate and to be displaceable between a home position in which the spacer rod is aligned with the hydraulic cylinder and a disengaged position in which the spacer rod is unaligned with the hydraulic cylinder.

2. The filter press of claim 1, further comprising an extension rod mounted in alignment with the hydraulic cylinder.

3. The filter press of claim 2, wherein the spacer rod is aligned with the extension rod and disposed between the extension rod and the follower plate when the swing arm is disposed in the home position.

4. The filter press of claim 2, wherein the extension rod is supported by one or more carrier plates.

5. The filter press of claim 4, wherein the spacer rod is unaligned with the extension rod and disposed in a position above one of the one or more carrier plates most proximate the follower plate when the swing arm is disposed in the disengaged position.

6. The filter press of claim 1, further comprising a handle disposed on an opposite end of the swing arm from the spacer rod.

7. The filter press of claim 1, wherein the moveable support includes a retention element configured to hold the moveable support in at least one of the home position and the disengaged position.

8. The filter press of claim 1, further comprising a manually operated hand pump configured to pressurize the hydraulic cylinder.

9. The filter press of claim 2, wherein the extension rod is mounted between the hydraulic cylinder and the follower plate.

* * * * *